UNITED STATES PATENT OFFICE.

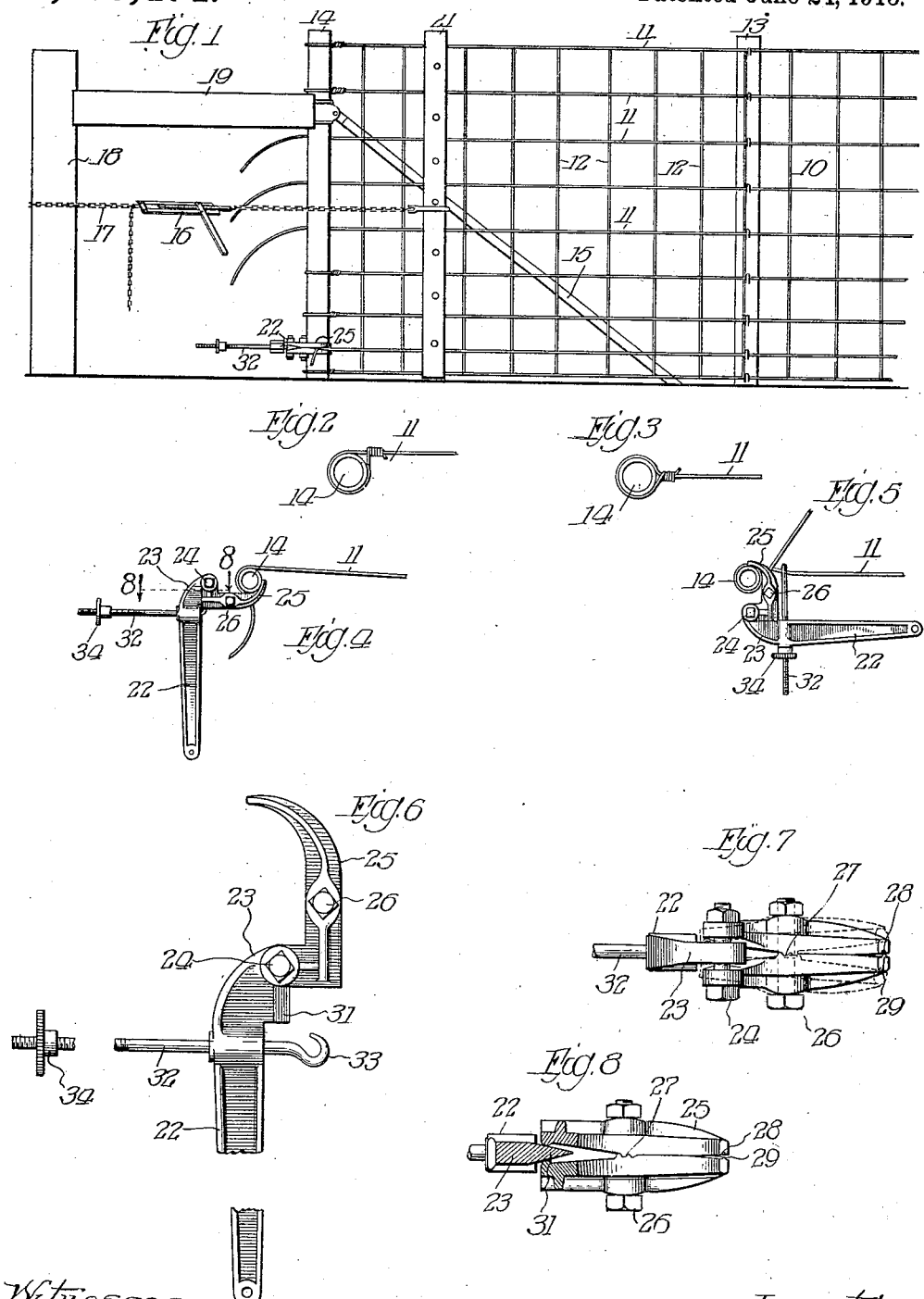

ARTHUR W. SPRAGUE, OF LA GRANGE, AND JOHN A. COCKER, OF JOLIET, ILLINOIS, ASSIGNORS TO THE AMERICAN STEEL AND WIRE COMPANY OF NEW JERSEY, OF HOBOKEN, NEW JERSEY, A CORPORATION OF NEW JERSEY.

FENCE-END TOOL.

1,065,474.   Specification of Letters Patent.   Patented June 24, 1913.

Application filed January 30, 1913. Serial No. 745,273.

*To all whom it may concern:*

Be it known that we, ARTHUR W. SPRAGUE and JOHN A. COCKER, both citizens of the United States, and residing at La Grange, in the county of Cook, and at Joliet, in the county of Will, State of Illinois, respectively, have invented certain new and useful Improvements in Fence-End Tools, of which the following is a specification.

This invention has reference in general to wire fence tools and its primary object is to provide a simple, durable and inexpensive tool by means of which the fence line wires may be secured to an end post in such a manner that no slippage of the wires on the post or slackening of the wires will occur after they have been secured.

It is customary to attach line wires to the metal end posts, now in general use, by first pulling the free ends of the wires around the post and then twisting them about the taut line wires which are disposed tangentially to the outer face of the post. After the wires have been secured and the stretcher has been taken off so that all of the strain comes upon the end post, the wires have a tendency to slip around the post until the pull is exerted along a line passing through the center of the post. This slippage of the wires so that the pull is exerted radially instead of tangentially of the post decreases the tension of the wires and, consequently, produces objectionable slack in the fence.

Our present invention, therefore, has been designed to stretch the free ends of the wires tightly around the end post and then displace or bend the taut line wires from the tangential to a radial position before the ends are wrapped around them, thereby obviating the above noted slippage and consequent slackening of the fence after connection with the post has been established.

The invention will be best understood by reference to the following description when considered in connection with the accompanying drawings throughout the various views of which like reference characters refer to similar parts.

Referring to the drawings—Figure 1 is a side elevation of a portion of a fence showing the manner of stretching and securing the line wires to the end post; Fig. 2 is a plan view of an end post showing the manner of attaching the line wires thereto prior to our present invention; Fig. 3 is an end view showing how the line wires are secured to the end post by the use of our improved tool; Fig. 4 is a plan view showing the tool as grasping a wire prior to the stretching operation; Fig. 5 is a similar view showing the position of the wire just before the free end is twisted around the taut line wire; Fig. 6 is an enlarged plan view of our improved tool; Fig. 7 is an end view thereof, the jaws being shown in closed position by full lines and in open position by dotted lines; and Fig. 8 is a sectional view taken substantially on the line 8—8 of Fig. 4.

On the drawings reference character 10 designates generally a woven wire fence comprising the line wires 11 and the stay wires 12 which, in the present instance, are shown as vertically arranged. This style of fence, however, is shown merely for purposes of illustration, since our invention is not restricted in its use to any particular type of fence and may be employed for stretching and securing a woven wire fence, barb wires, or any other preferred line wires. The fence in the present instance is supported intermediate its ends by the line posts 13 and is secured at the end of the line to an end post 14 braced in any suitable manner as, for instance, by an inclined brace 15, as shown. In stretching fences of this general character it is customary to employ a stretcher 16 of any preferred construction attached by a chain at one end to a back post 18 braced by a suitable brace 19 from the end post 14, and attached at its other end to a clamp 21 secured to the line wires of the fence. After the fence has been stretched to the required tension by this apparatus the ends of the line wires have been wrapped around the end post 14 and the free ends thereof have been twisted around the line wires substantially as shown in Fig. 2.

The metal end posts which are now customarily used afford no provision for preventing the wires from slipping around the post and after the stretcher has been removed from the fence the line wires 11 will slip from their original tangential position as shown in Fig. 2 to a position in line with the radius of the post as illustrated in Fig. 3. This slipping, of course, releases to some extent the tension on the line wires and results in objectionable slack in the fence.

Our present invention comprises a tool designed to bend or deflect the line wires from their tangential relation to the end post, as shown in Fig. 4, to substantially a radial position, as shown in Fig. 5, before the free ends of the wires are twisted around the line wires to effect the connection with the post, so that after the connection is made there is no tendency for the wires to slip and produce slack in the fence. The preferred embodiment of our invention comprises a handle 22 of suitable length having an offset portion 23 at one end to which there is pivotally connected by a bolt 24 a pair of clamping jaws 25. These jaws are pivotally connected intermediate their ends by a bolt 26 which is smaller than the holes in the jaws through which it passes so that said jaws may fulcrum on the interengaging seats 27 to open and close their free extremities. The ends of the jaws are curved as shown to conform to the curvature of an end post and, in order that the wire may be firmly grasped between the jaws, one of them is preferably provided with a groove 28 and the other is provided with a bead 29 adapted to coöperate with the groove to firmly clamp the wire between the jaws. For the purpose of automatically closing the jaws upon a wire the handle adjacent the pivotal connection with the jaws is shaped to provide a wedge 31 which, when the handle is swung about its pivot to the position shown in Figs. 4 and 5, enters between the rear ends of the jaws and forces the clamping ends of the jaws tightly together. When the tool is to be employed, the handle is swung to the position shown in Fig. 6 so that the jaws may open. The free end of a line wire is then inserted between the jaws and the jaws are moved up close to the post. The handle is then swung on its pivot to force the wedge 31 between the rear ends of the jaws to clamp the wire between the jaws and the tool is then pushed or pulled from the position shown in Fig. 4 to that shown in Fig. 5, drawing the free end of the wire tightly around the post. The tool is prevented from slipping off the post during the stretching operation by reason of the curved formation of the jaws.

In order to draw the taut line wire toward the center line of the post we have provided the tool with a rod 32 slidingly mounted on the handle and provided at one end with a hook 33 and threaded at its other end to receive the knurled nut 34. After the tool has been moved into the position shown in Fig. 5 to stretch the free end of the wire around the post, the hook 33 is engaged with the line wire 11 and the nut 34 is threaded onto the rod to draw the line wire from its tangential position to a substantially radial position as shown. The ends of the clamping jaws are held apart a sufficient distance by the gripped end of the wire so that when the tool is swung around the post during the stretching operation the jaw ends will straddle the taut line wire as shown in Fig. 5. This permits the free end of the wire to be brought into close proximity with the taut line wire and properly positioned to be tightly wrapped around the line wire without leaving any slack.

It is believed that our invention will be understood from the foregoing without further description and, while we have shown the preferred construction of a tool for positioning the line wires so that no slippage on the end post will occur after the wires have been secured, it will be obvious that variations and modifications of the particular construction shown and described may be resorted to without departing from the spirit of the invention or sacrificing any of the material advantages thereof.

We claim:

1. An end tool comprising a handle, means carried thereby to engage the end of a line wire and draw said end around a post, and means for bending the taut line wire toward the center line of the post to receive said end to be connected therewith.

2. An end tool comprising a handle, a pair of curved jaws mounted thereon to engage a post, means carried by said handle for closing the jaws upon a wire, whereby said wire may be drawn around the post by operating said handle, and means carried by said handle whereby the stretched wire may be pulled toward the jaws for connection with the end held by the jaws.

3. An end tool comprising a handle, and a pair of jaws pivotally mounted thereon and pivotally connected together intermediate their ends, said handle being provided with a wedge adapted, upon movement of the handle about the pivotal connection with the jaws, to close said jaws.

4. In an end tool, the combination of a handle, a clamp pivotally mounted thereon, and a wedge carried by the handle for operating said clamp upon relative movement between the handle and clamp.

5. In an end tool, the combination of a handle, a pair of curved clamping jaws pivotally mounted on said handle, a wedge adapted to close said jaws upon relative movement between the handle and jaws, a hook projecting from the handle, and means for moving said hook toward the handle.

6. In an end tool, the combination of a handle, a pair of clamping jaws pivotally connected together intermediate their ends and pivotally connected at one end to said handle, means for closing said jaws upon pivotal movement between the handle and jaws, means adapted to be engaged with a wire, and means for drawing said wire toward the handle.

7. In an end tool, the combination of a handle, a pair of jaws curved to conform to the curvature of a post, means for closing the jaws whereby to grasp a wire therebetween upon relative movement between the jaws and handle, a hook projecting from said handle adjacent the jaws when in closed position, and means for drawing said hook toward the handle.

ARTHUR W. SPRAGUE.

Witnesses:
 IRA J. WILSON,
 A. F. ALLEN,

JOHN A. COCKER.

Witnesses:
 CHARLES H. VOIGHT,
 G. E. HOLMES.

Copies of this patent may be obtained for five cents each, by addressing the "Commissioner of Patents, Washington, D. C."